(12) United States Patent
Oguchi et al.

(10) Patent No.: US 8,896,411 B2
(45) Date of Patent: Nov. 25, 2014

(54) INFORMATION PROCESSING APPARATUS

(75) Inventors: Shoko Oguchi, Tokyo (JP); Toshiya Tamura, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 683 days.

(21) Appl. No.: 12/713,813

(22) Filed: Feb. 26, 2010

(65) Prior Publication Data

US 2011/0012748 A1  Jan. 20, 2011

(30) Foreign Application Priority Data

Jul. 16, 2009 (JP) .................................. 2009-168216

(51) Int. Cl.
*G08C 17/00* (2006.01)
*G08C 17/02* (2006.01)
*H04M 1/60* (2006.01)

(52) U.S. Cl.
CPC ............. *G08C 17/02* (2013.01); *H04M 1/6066* (2013.01)
USPC .......................................................... 340/1.1

(58) Field of Classification Search
USPC ................................ 340/1.1, 2.1, 3.1, 3.3, 5.1
See application file for complete search history.

(56) References Cited

U.S. PATENT DOCUMENTS

| | | | | |
|---|---|---|---|---|
| 6,008,921 | A * | 12/1999 | Brusky et al. .................. | 398/106 |
| 6,072,472 | A * | 6/2000 | Shiga ............................ | 345/168 |
| 6,509,845 | B1 | 1/2003 | Tanaka | |
| 7,546,548 | B2 * | 6/2009 | Chew et al. .................... | 715/810 |
| 2007/0271513 | A1 * | 11/2007 | Andren ......................... | 715/703 |

FOREIGN PATENT DOCUMENTS

| | | |
|---|---|---|
| JP | 2000-259331 A | 9/2000 |
| JP | 2007-324831 | 12/2007 |
| JP | 2008-259067 A | 10/2008 |

OTHER PUBLICATIONS

JP Office Action mailed on Nov. 13, 2012 in application No. 2009-168216.

\* cited by examiner

*Primary Examiner* — Jennifer Mehmood
*Assistant Examiner* — Yong Hang Jiang
(74) *Attorney, Agent, or Firm* — Maschoff Brennan

(57) ABSTRACT

An information processing apparatus has a short-distance wireless communication unit which communicates with external equipment, an input unit, a timer, and a control unit. The input unit generates a press event in response to depression of the input unit and a release event in response to release the input unit from the depression. The timer measures an elapsed time. The control unit starts the timer in response to reception of the press event, transmits a press command or a release command to the external equipment in response to the reception of the press event or the release event, and transmits the release command to the external equipment when the control unit detects that the elapsed time reaches a specific time and no event is received from the input unit.

6 Claims, 8 Drawing Sheets

INFORMATION PROCESSING APPARATUS

BACKGROUND

1. Technical Field

The present invention relates to an information processing apparatus.

2. Related Art

Recently, technology for performing remote control of audio/video (AV) equipment using wireless communication is known. For example, in the Bluetooth® standard, an audio/video remote control profile (AVRCP) is provided for performing the remote control of AV equipment. JP-A-2007-324831 discloses an audio playback device that transmits volume information to external equipment by AVRCP.

In volume control in accordance with the AVRCP, while a volume adjustment button of a control terminal is being pressed, a volume increase command or a volume decrease command (hereinafter referred to as "press command") is transmitted from the control terminal to external equipment at an interval which is not more than a predetermined time. Also, if the volume adjustment button is released from the pressed state, a release command is transmitted from the control terminal to the counterpart terminal.

In the AVRCP Reference Document "AV/C Panel Subunit Specification 1.1", it is defined that the press command is valid for 2.0 seconds. Thus, while the volume adjustment button is being pressed, the control terminal needs to transmit the press command to the external equipment at an interval which is not more than 2.0 seconds.

However, for example, when there is a heavy processing load on a CPU (Central Processing Unit) of the control terminal due to executing an application program, the CPU may not recognize that an event indicating that the volume adjustment button is being pressed or an event indicating that the volume adjustment button is released. In this case, it is difficult for the control terminal to transmit the press command or the release command to the external equipment at an interval which is not more than the predetermined time.

SUMMARY

Exemplary embodiments of the invention provides an information processing apparatus that includes a short-distance wireless communication unit which communicates with an external equipment, an input unit which generates a press event in response to depression of the input unit and a release event in response to release the input unit from the depression, a timer which measure an elapsed time, and a control unit which starts the timer in response to reception of the press event, transmits a press command or a release command to the external equipment in response to the reception of the press event or the release event, and transmits the release command to the external equipment when the control unit detects that the elapsed time reaches a specific time and no event is received from the input unit.

DETAILED DESCRIPTION

Hereinafter, with reference to the accompanying drawings, exemplary embodiments of the present invention will be described.

In the embodiments, a case in which a volume adjustment command is transmitted from a mobile phone that makes wireless communication with a handset via a short-distance wireless communication link will be described. However, this disclosure is not intended to be limited to the mobile phone and the headset, but it is intended to cover every device such as a personal computer (PC), a personal digital assistant (PDA), and an audio player with a short-distance wireless communication function.

Figure 1:
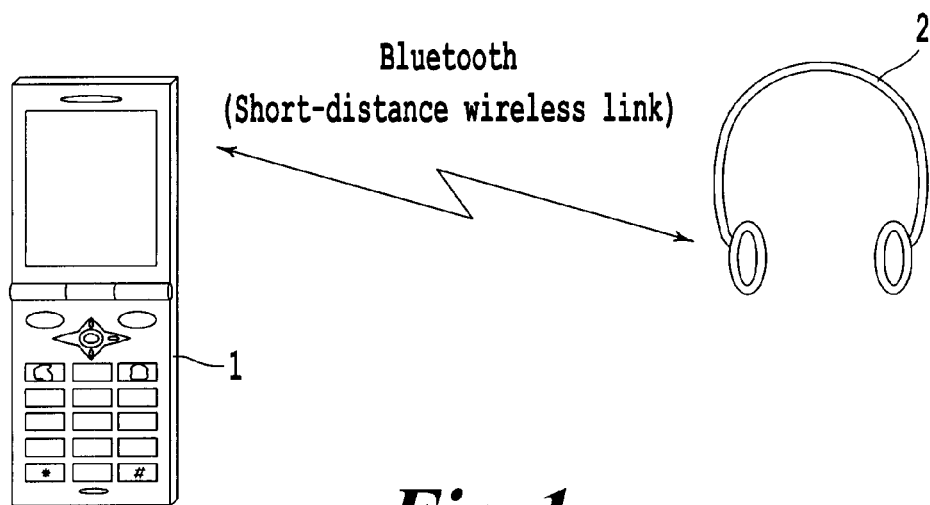
FIG. 1 shows an exemplary system composition where a mobile phone 1 and a headset 2 are connected via a short-distance wireless link.

FIG. 1 shows an exemplary system composition where a mobile phone 1 and a headset 2 are connected via a short-distance wireless link such as a Bluetooth® link. For example, if the mobile 1 transmits a volume control command in accordance with the AVRCP to the headset 2 via the short-distance wireless communication link, the volume control command is received by the headset 2. Then, the headset 2 sets or adjusts a volume level of the headset 2 in accordance with the volume control command.

Figure 2:
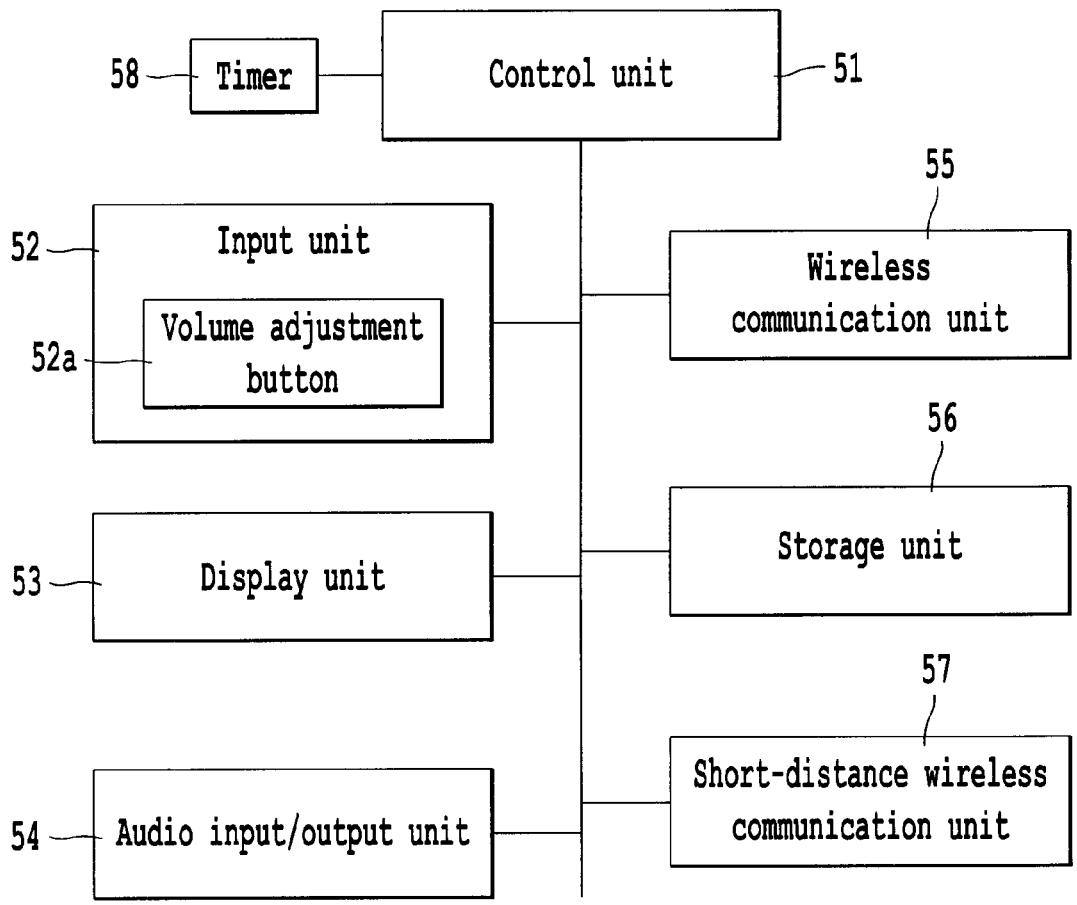
FIG. 2 is a block diagram illustrating an exemplary configuration of a mobile phone 1.

FIG. 2 is a block diagram illustrating an exemplary configuration of the mobile phone 1. The mobile phone 1 includes a control unit 51, an input unit 52, a display unit 53, an audio input/output unit 54, a wireless communication unit 55, a storage unit 56, a short-distance wireless communication unit 57, and a timer 58.

The control unit 51 may include a CPU, a ROM, a RAM, and the like, and controls the entire mobile phone 1.

The input unit 52 may be a key input device, a touch panel or a touch sensor, and outputs a signal to the control unit 51 in accordance with a user's manipulation. The input unit 52 is used for input alphanumeric information and instruction to activate an application program such as a mail function. The input unit 52 includes a volume adjustment button 52a. The volume adjustment button 52a may be composed of a volume-up key and a volume-down key. If one of the volume-up and volume-down keys is pressed, an event signal indicating that the one of the volume-up and volume-down keys is pressed is output to the control unit 51, while if one of the volume-up and volume-down keys is released from a pressed state, an event signal indicating that the one of the volume-up and volume-down key is released to the control unit 51. If the input unit 52 is the touch panel, the volume adjustment button 52a may be realized in the touch panel. In this case, when a user contacts the volume adjustment button 52a on the display unit 53, the user's contact is sensed by the touch panel and a signal indicating that the volume adjustment button 52a on the display unit 53 is touched is output to the control unit 51. The signal output in response to the detection of the user's touch is the same signal as is output in response to depression of the volume adjustment button 52a of the key input device.

The display unit 53 may be a liquid crystal display, an organic EL display, or the like, and displays text or an image in accordance with the execution of an application program.

The audio input/output unit 54 may include a speaker and a microphone, and inputs and outputs voices during speech communication via the wireless communication unit 55. Also, audio or music of music content or moving image content is output from the microphone of the audio input/output unit 54.

The wireless communication unit 55 performs speech communication or packet communication through a base station. For example, in the case of transmitting voices during the speech communication, the wireless communication unit 55 receives the voice data from the control unit 51. The voice data is generated by the control unit 51 by modulating and encoding the voices inputted via the microphone of the audio input/output unit 54. When the wireless communication unit 55 receives the voice data, the voice data is converted into radio signals, and thereafter the radio signals are transmitted to the base station. The voice data may contain an error control data generated by the control unit 51. On the other hand, in the case of receiving voice data, the wireless communication unit 55 receives radio signals from the base station, converts the radio signals into electric signals, and then outputs the electric signals to the control unit 51. The electric signals received by the control unit 51 are decoded and demodulated, and then voices are obtained. Thereafter, the voices are output from the speaker of the audio input/output unit 54.

The storage unit 56 stores various kinds of application software, music contents, moving image contents, and the like.

The short-distance wireless communication unit 57 may be a Bluetooth® communication module, and the like, and outputs a volume control command in accordance with the AVRCP to the external equipment.

First Embodiment

Figure 3:
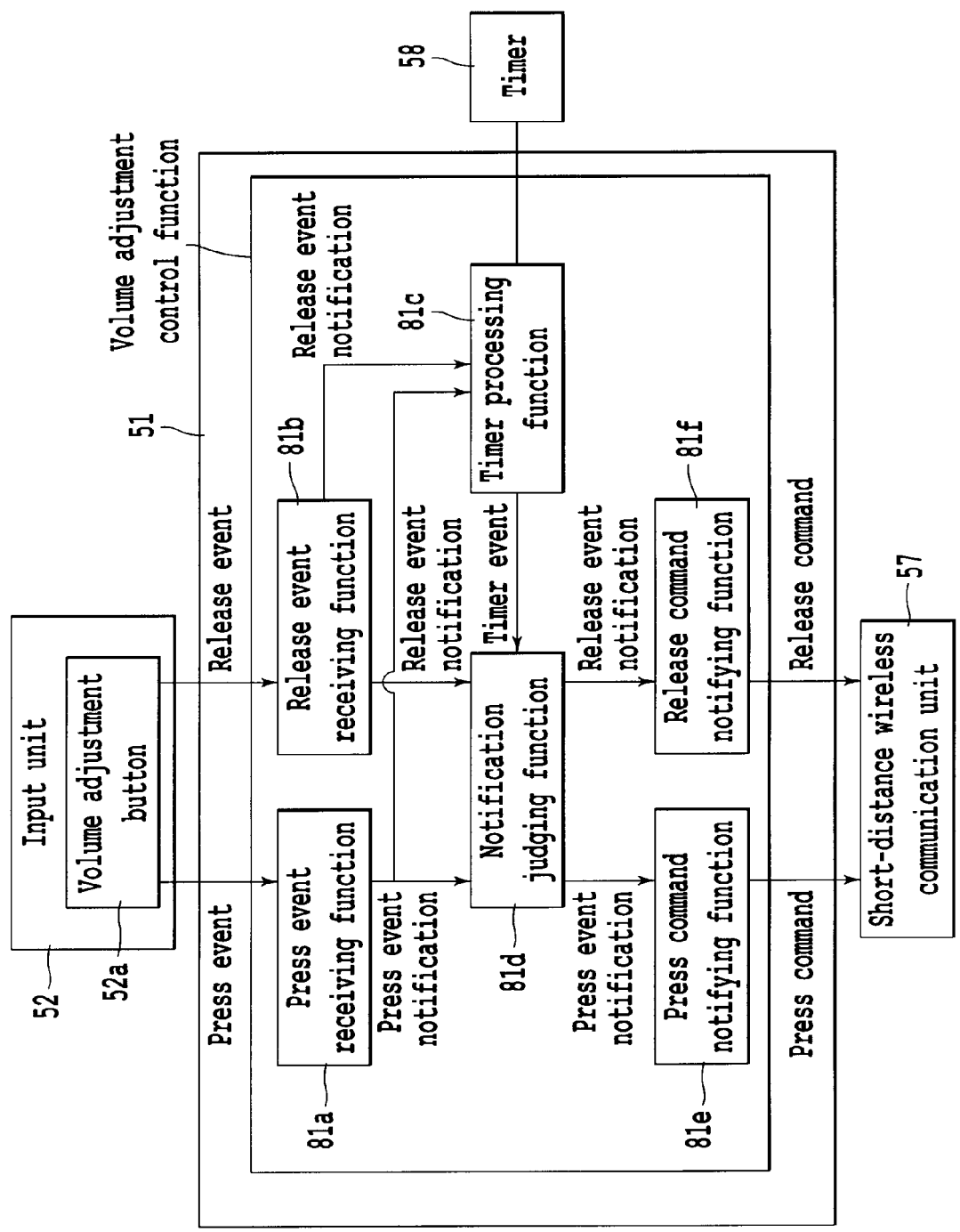
FIG. 3 is a block diagram illustrating a functional configuration of a volume adjustment control function of the first embodiment.

FIG. 3 is a block diagram illustrating a functional configuration of a volume adjustment control function of the first embodiment. The volume adjustment control function includes a press event receiving function 81a, a release event receiving function 81b, a timer processing function 81c, a notification judging function 81d, a press command notifying function 81e, and a release command notifying function 81f.

The press event receiving function 81a receives from the input unit 52 a press event indicating that the volume adjustment button is pressed. Then, the press event receiving function 81a transmits a press event notification to the timer processing function 81c and the notification judging function 81d.

The release event receiving function 81b receives from the manipulation unit 52 a release event indicating that the volume adjustment button is released. Then, the release event receiving function 81b transmits a release event notification to the timer processing function 81c and the notification judging function 81d.

The timer processing function 81c starts the timer 58 to measure an elapsed time when the press event notification is received from the press event receiving function 81a. Also, if the elapsed time is being measured when the press event notification is received, the timer processing function 81c resets the elapsed time being measured by the timer 58, and restarts the timer 58. By contrast, if the timer processing function 81c receives the release event notification from the release event receiving function 81b, the timer processing function 81c resets the elapsed time being measured by the timer 58, and stops the time measurement. If the elapsed time measured by the timer 58 elapses a predetermined time, the timer processing function 81c transmits a timer event to the notification judging function 81d. In this case, the predetermined time measured by the timer 58 is a period of time that is shorter than a specified time period A with which the press event notifying function 81e is required to transmit a press command while the volume adjustment button 52a is being pressed. If the specified time period A is 2.0 seconds, the predetermined time measured by the timer 58 is an arbitrary time which is not more than 2.0 seconds, for example, 1.5 seconds may be set to the timer 58.

When the press event notification is received from the press event receiving function 81a, the notification judging function 81d forwards the press event notification to the press command notifying function 81e, and when the release event notification is received from the release event receiving function 81b, the notification judging function 81d forwards the release event notification to the release command notifying function 81f. Also, when the timer event is received from the timer processing function 81c, the notification judging function 81d generates a release event notification and transmits the release event notification to the release command notifying function 81f.

When the press event notification is received from the notification judging function 81d, the press command notifying function 81e generates a press command to be transmitted to the headset 2, and outputs the generated press command to the short-distance wireless communication unit 57.

If the release event notification is received from the notification judging function 81d, the release command notifying function 81f generates a release command to be transmitted to the headset 2, and outputs the generated release command to the short-distance wireless communication unit 57.

The short-distance wireless communication unit 57 converts the press command received from the press command notifying function 81e or the release command received from the release command notifying function 81f into packet data pursuant to the Bluetooth® standard and transmits the packet data to the headset 2 over a short-distance wireless link established between the mobile phone 1 and the headset 2.

Figure 4:
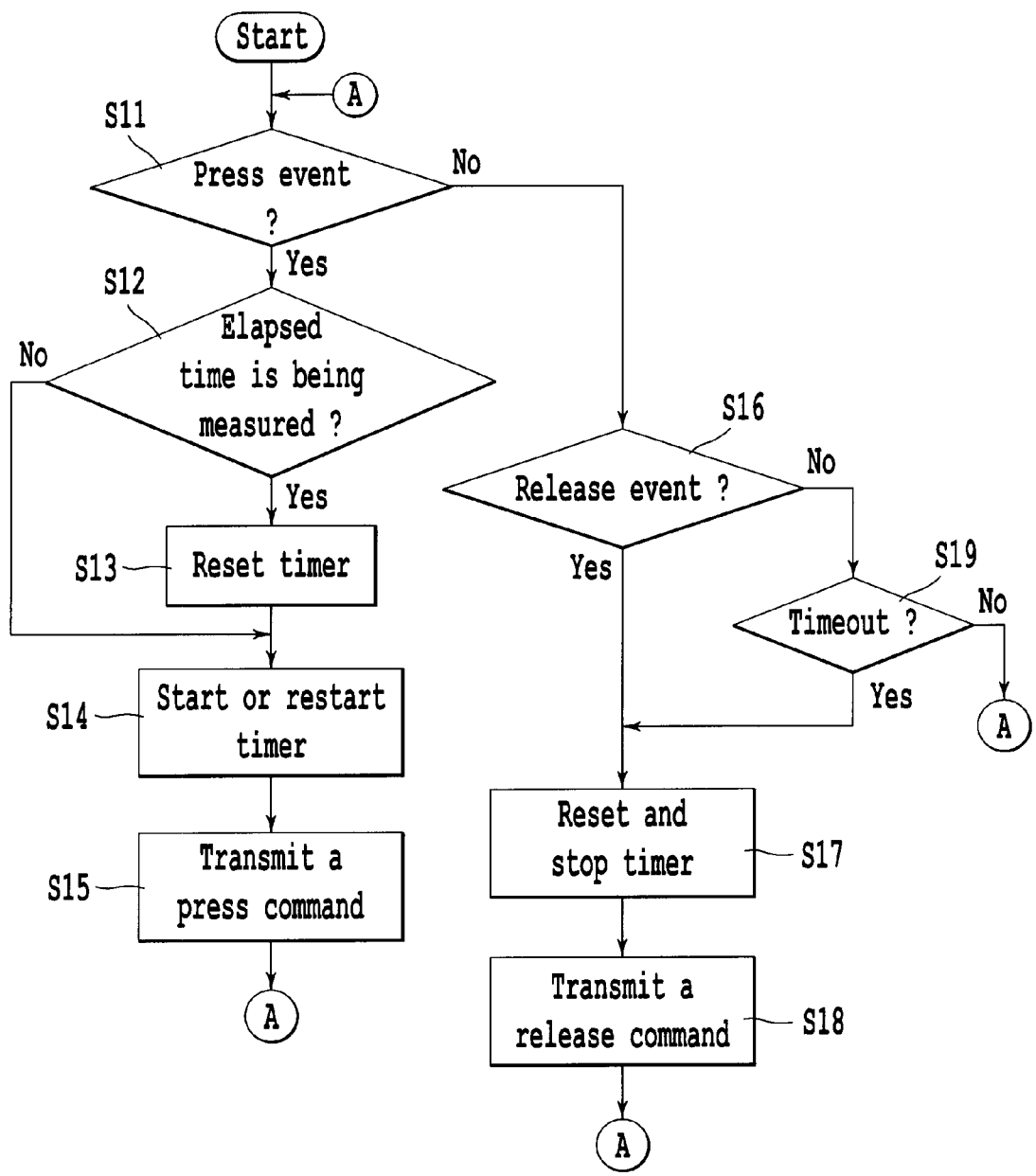
FIG. 4 is a flowchart illustrating a command transmitting process according to the first embodiment.

FIG. 4 is a flowchart illustrating a command transmitting process according to this embodiment. When the press event receiving function 81a receives a press event from the input unit 52 ("Yes" in S11), the press event receiving function 81a transmits a press event notification to the notification judging function 81d and the timer processing function 81c. If the elapsed time is being measured by the timer 58 ("Yes" in S12) when the timer processing function 81c receives the press event notification, the elapsed time being measured is reset (S13). Thereafter, the timer 58 is restarted by the timer processing function 81c (S14). On the other hand, if the elapsed time is not being measured by the timer 58 ("No" in S12), the timer 58 is started by the timer processing function 81c (S14). On the other hand, when the notification judging function 81d receives the press event notification, the press event notification is forwarded to the press command notifying function 81e. Thereafter, the press command notifying function 81e generates a press command and transmits the press command to the headset 2 via the short-distance wireless communication unit 57 (S15).

On the other hand, when the release event receiving function 81b receives the release event ("Yes" in S16), the release event receiving function 81b transmits the release event notification to the notification judging function 81c and the timer processing function 81c. When the timer processing function 81c receives the release event notification, the timer processing function 81c resets the timer 58, and subsequently stops the timer 58 from measuring the elapsed time (S17). On the other hand, when the notification judging function 81c receives the release event notification, the notification function 81c forwards the received release event notification to the release command notifying function 81f. Thereafter, the release command notifying function 81f, in response to the reception of the release event notification, generates a release command and transmits the release command to the headset 2 via the short-distance wireless communication unit 57 (S18).

By contrast, if the timer processing function 81c recognizes that the elapsed time measured by the timer 58 reaches a specified time without receiving the press event notification or the release event notification ("Yes" in S19), the timer processing function 81c resets the timer 58, and subsequently stops the timer 58 from measuring the elapsed time (S17). Also, the timer processing function 81c transmits the timer event to the notification judging function 81d. When the notification judging function 81d receives the timer event, the notification judging function 81d generates a release command and transmits the release event notification to the release command notifying function 81f. Thereafter, in the same manner as described above, the release command notifying function 81f generates a release command and transmits the release command to the headset 2 via the short-distance wireless communication unit 57 (S18).

Figure 5:
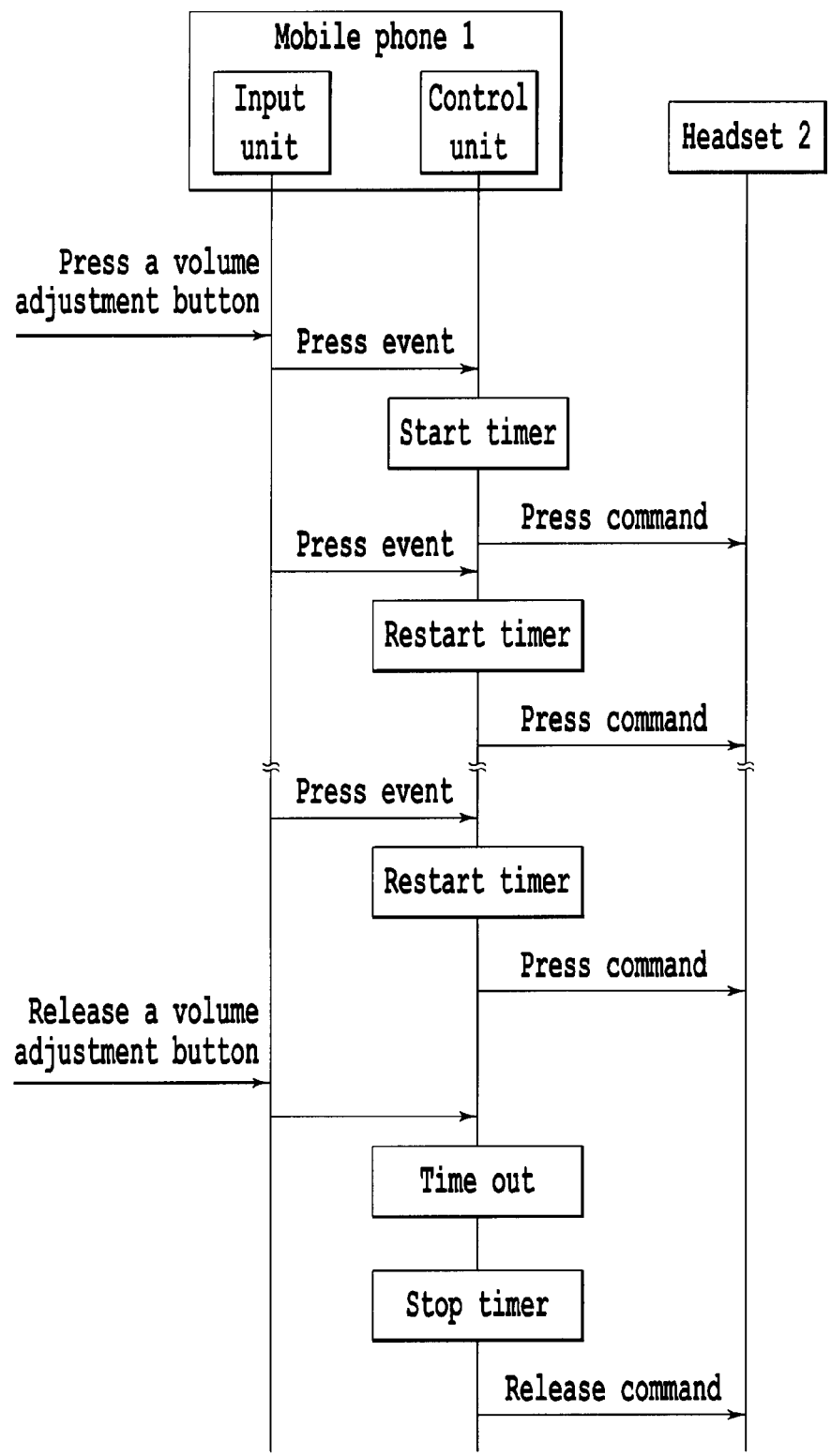
FIG. 5 is a sequential diagram showing an example of the volume adjustment to the headset 2.

FIG. 5 is a sequential diagram showing an example of the volume adjustment to the headset 2. If the volume adjustment button 52a of the input unit 52 of the mobile phone 1 is pressed, the press event is transmitted from the input unit 52 to the control unit 51.

When a press event from the input unit 52 in response to the depression of the volume adjustment button 52a is received, the control unit 51 generates a press command and transmits the press command to the headset 2. Also, as the press event, a logical event is transmitted to the control unit 51 at predetermined intervals while the volume adjustment button 52a is being pressed. When the press event is received, the control unit 51 stars the timer 58 to measure an elapsed time, and transmits a press command to the headset 2. Thereafter, the control unit 51 resets the timer 58 each time the control unit 51 receives the press event if the measured elapsed time does not reach the specified time.

When the volume adjustment button 52a is released from the pressed condition, the input unit 52 transmits a release event to the control unit 51. Thereafter, when the release event is received, the control unit 51 stops the timer 58 from measuring the elapsed time, and transmits the release command to the headset 2.

However, there may be a case that the control unit 51 does not recognize either the press event or the release event due to a heavy processing load and so on. Although the control unit 51 cannot recognize the press event and the release event, the press event and the release event are stored in a buffer memory so that the control unit 51 can handle these events later. Therefore, when the processing load lightens and a plurality of press events are stored in the buffer memory, the stored press events are processed by the control unit 51 and accordingly a plurality of press commands are transmitted to the headset 2. As a result of this, a volume level of the headset 2 is turned up or turned down unintentionally.

However, as shown in FIG. 5, the control unit 51 transmits the release command to the headset 2 in response to the reception of the timer event which is generated when the measured elapsed time reaches the specified time. Therefore, even when the control unit 51 cannot recognize the press event, the mobile phone 1 can prevent the volume of the headset 2 from turning up and down unintentionally. In this case, the control unit 51 may discard all press event notification received after the transmission of the release event notification in response to the timer event until the next release event is received from the input unit 52.

As described above, this exemplary embodiment focuses on the volume control processing, however, one skilled in the art readily understand that the above described process can apply to control methods where a plurality of key input events are processed while a key is being pressed.

As described above, it is exemplified that the control unit 51 starts or restarts the timer 58 and then transmits the press command to the headset 2 when the control unit 51 receives the press event. However, the control unit 51 may transmit the press command after the control unit 51 starts or restarts the timer 58.

Second Embodiment

Figure 6:
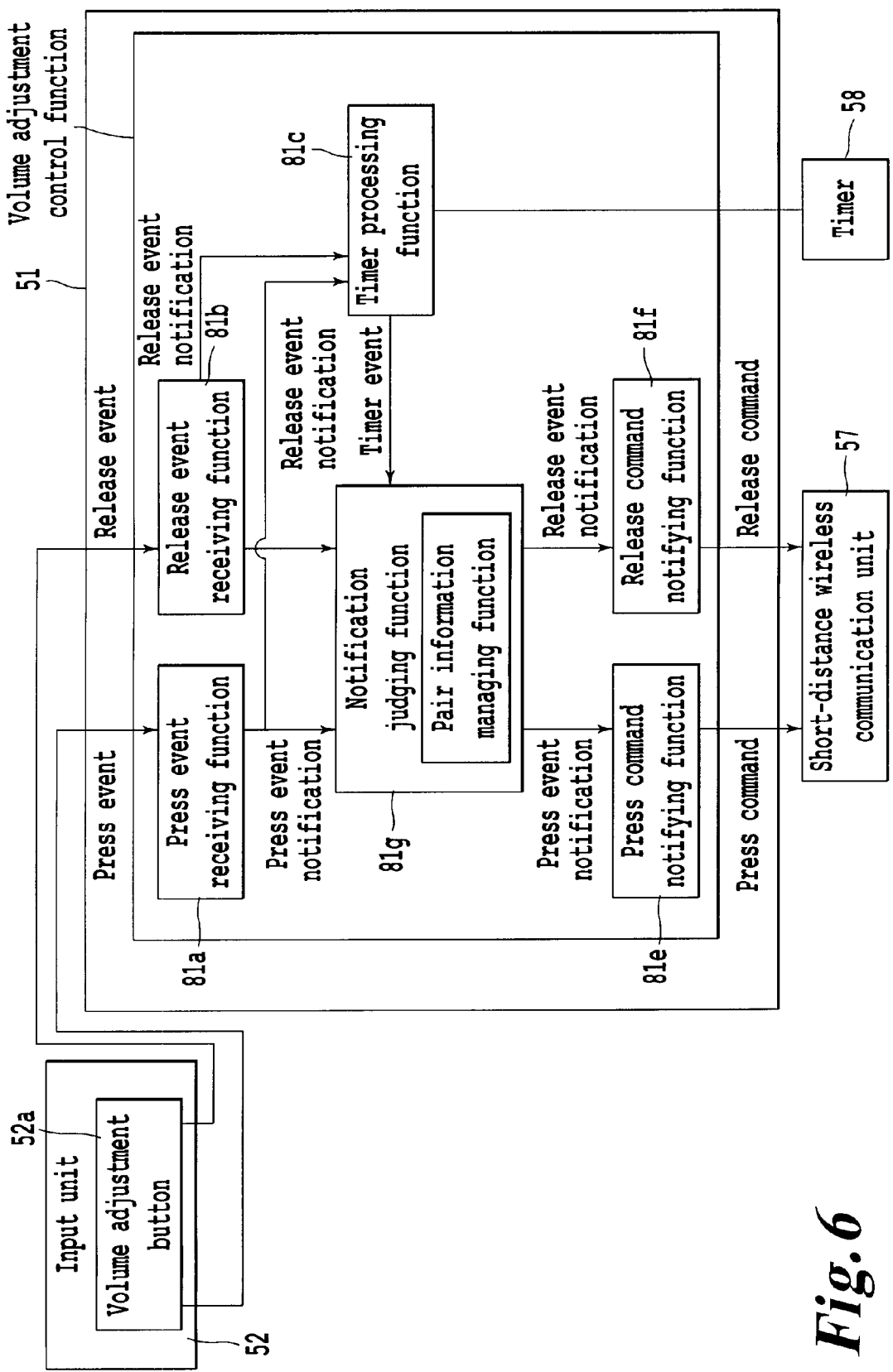
FIG. 6 is a block diagram illustrating a functional configuration of a volume adjustment control function of the second embodiment.

FIG. 6 is a block diagram illustrating a functional configuration of the volume adjustment control function of the second embodiment.

According to FIG. 6, the notification judging function 81g includes a pair information managing function 81h. In this case, since the press event receiving function 81a, the release event receiving function 81b, the timer processing function 81c, the press command notifying function 81e, and the release command notifying function 81f have the same as is described above with reference to FIG. 3, and thus the detailed description thereof will be omitted.

In the case of receiving the timer event from the timer processing function 81c, the notification judging function 81g transmits a release event notification to the release command notifying function 81f. Also, the notification judging function 81f has the pair information managing function 81h to store pair information to the storage unit 56. The pair information indicates that the release event notification is transmitted to the release command notifying function 81f in response to the reception of the timer event. The pair information may be stored in a work memory such as a RAM in the control unit.

If the notification judging function 81g receives a press event notification from the press event receiving function 81a while the pair information is stored in the storage unit 56, the notification judging function 81g forwards the received press event notification to the press command notifying function 81e and has the pair information managing function 81h to delete the pair information from the storage unit 56.

On the other hand, if the notification judging function 81g receives a release event notification from the release event receiving function 81b while the pair information is stored in the storage unit 56, the notification judging function 81g discards the received release event notification and has the pair information managing function 81g to delete the pair information from the storage unit 56.

In contrast, if the notification judging function 81g receives the press event notification while no pair information is stored in the storage unit 56, the notification judging function 81g forwards the press event notification to the press command notifying function 81e. Also if the notification judging function 81g receives the release event notification while no pair information is stored in the storage unit 56, the notification judging function 81g forwards the release event notification to the release command notifying function 81f.

Figure 7:
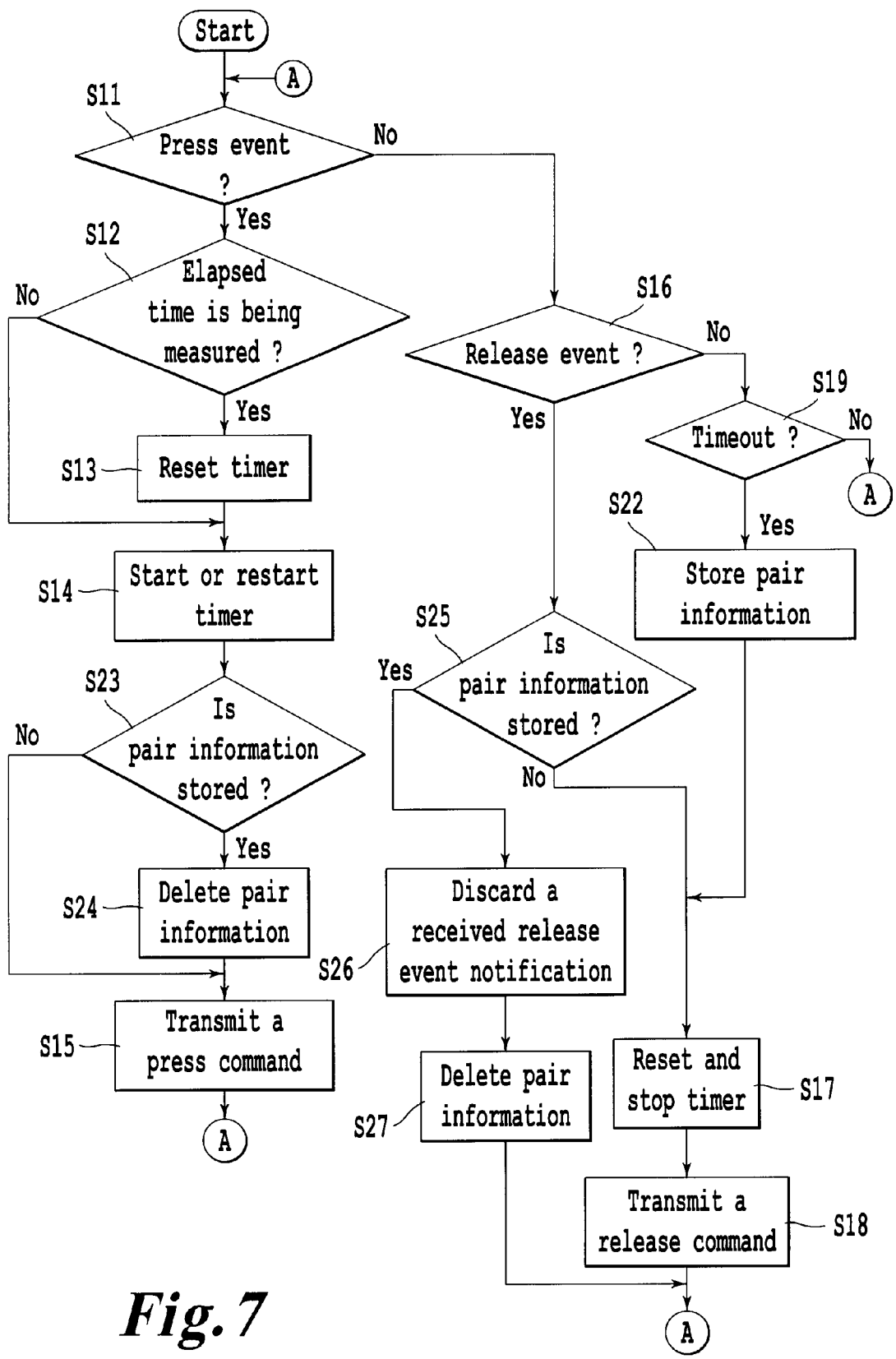
FIG. 7 is a flowchart illustrating a command transmitting process according to the second embodiment.

FIG. 7 is a flowchart illustrating a command transmitting process according to this embodiment. When the press event receiving function 81a receives a press event from the input unit 52 ("Yes" in S11), the press event receiving function 81a transmits a press event notification to the timer processing function 81c and the notification judging function 81g. If the elapsed time is being measured by the timer 58 ("Yes" in S12) when the timer processing function 81c receives the press event notification, the elapsed time that is being measured is reset (S13). Thereafter, and the timer 58 is restarted by the timer processing function 81c (S14). On the other hand, if the elapsed time is not being measured by the timer 58 ("No" in S12), the timer 58 is started by the timer processing function 81c (S14). On the other hand, when the notification judging function 81g receives the press event notification from the press event receiving function 81a, the notification judging function 81g checks whether pair information is stored in the storage unit 56 (S23). If the pair information is stored in the storage unit 56 ("Yes" in S23), the notification judging function 81g has the pair information managing function 81h to delete the pair information from the storage unit 56. On the other hand, if no pair information is stored in the storage unit 56 ("No" in S23) or after the pair information is deleted from the storage unit 56 in S24, the press event notification is forwarded to the press command notifying function 81e by the notification judging function 81g. Thereafter, when the press command notifying function 81e receives the press event notification from the notification judging function 81g, the press command notifying function 81e generates a press command and transmits the press command to the headset 2 (S15).

On the other hand, when release event receiving function 81b receives a release event from the input unit 52 ("Yes" in S16), the release event receiving function 81b transmits a release event notification to the timer processing function 81c and the notification judging function 81g. Then, in response to the reception of the release event notification, the notification judging function 81g checks whether pair information is stored in the storage unit 56 (S25). If the notification judging function 81g recognizes that pair information is stored in the storage unit 56 ("Yes" in S25), the notification judging function 81g discards the received release event notification (S26). Thereafter, the notification judging function 81g has the pair information managing function 81h to delete the stored pair information (S27). If no pair information is stored in the storage unit 56 ("No" in S25), the notification judging function 81g forwards the received release event notification to the release command notifying function 81f. Also, when the timer processing function 81c receives the release event notification, the timer processing function 81c resets the timer 58, and subsequently stops the timer 58 from measuring the elapsed time (S17).

Thereafter, when the release command notifying function 81f receives the release event notification from the notification judging function 81g, the release command notifying function 81f generates a release command and transmits the release command to the headset 2 (S18).

By contrast, if the timer processing function 81c recognizes that the elapsed time measured by the timer 58 reaches a specified time without receiving the press event notification or the release event notification ("Yes" in S19), the timer processing function 81c transmits a timer event to the notification judging function 81g. If the elapsed time measured by the timer 58 does not reach the specified time ("No" in S19), the process goes to S11. When the notification judging function 81g receives the timer event from the timer processing function 81c, the notification judging function has the pair information managing function 81h to store pair information into the storage unit 56 (S22). On the other hand, the timer processing function 58c resets the timer 58, and subsequently stops the timer 58 from measuring the elapsed time (S17). On the other hand, the notification judging function 58g transmits a release event notification to the release event notification to the release command notifying function 81f. Then, the release command notifying function 81f, in response to the reception of the release event notification, generates a release command and transmits the release command to the headset 2 (S18).

Figure 8:
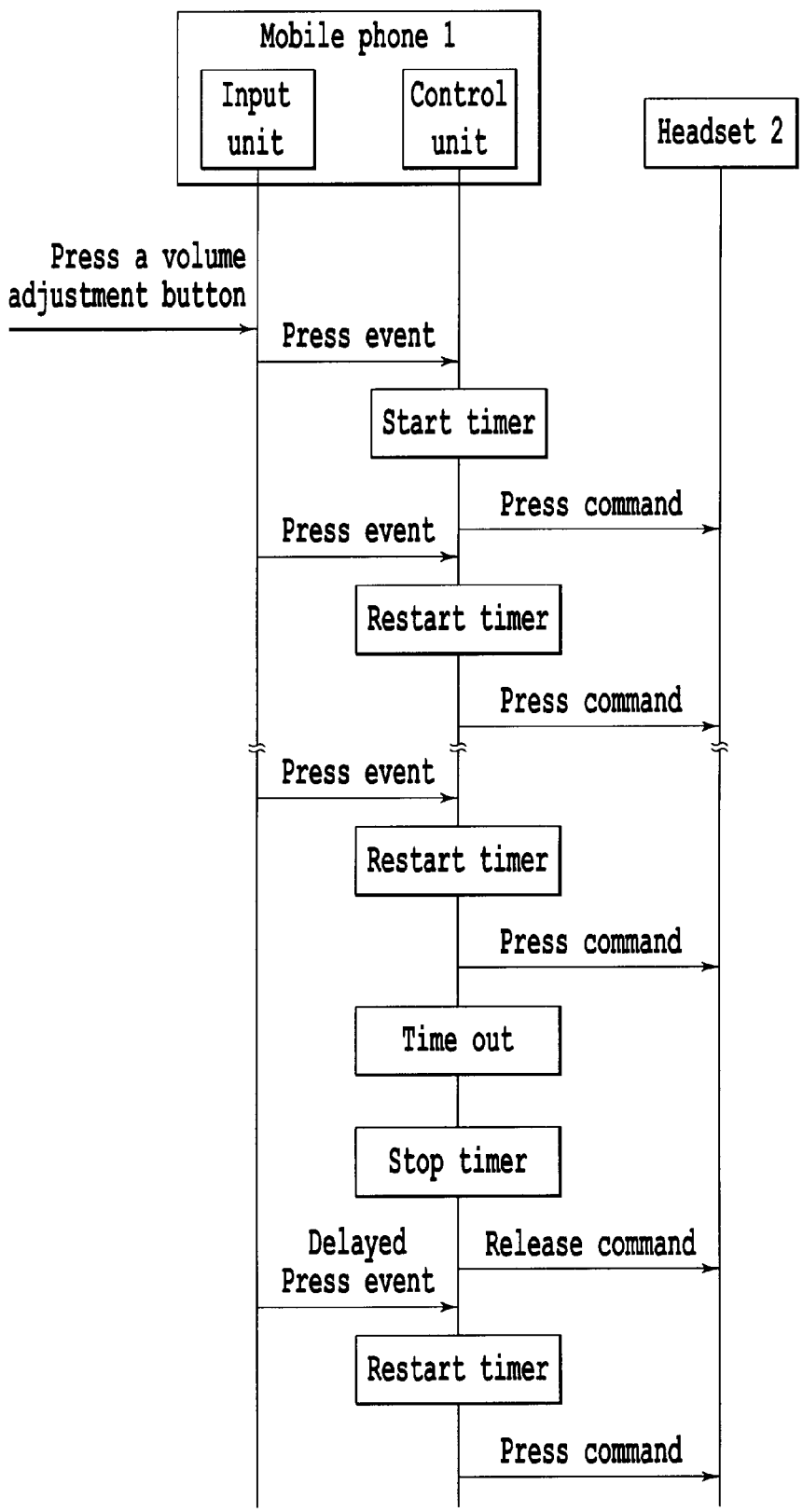
FIG. 8 is a sequential diagram showing an example of the volume adjustment to the headset 2.

FIG. 8 is a sequential diagram showing an example of the volume adjustment to the headset 2. In the same manner as the sequence shown in FIG. 5, if the press event is received from the input unit 51, the control unit 51 starts or restarts the timer 58, and transmits the press command to the headset 2. Here, if for any reason, the elapsed time which is being measured by the timer 58 reaches a specified time when the control unit 51 has recognized neither the press event nor the release event, the control unit 51 transmits the release command to the headset 2. Thereafter, if the control unit 51 recognizes the press event, which should have been recognized by the control unit 51 before the timeout of the timer 58, the control unit 51 starts the timer to measure the elapsed time as well as transmitting the press command to the headset 2.

As described above, since the press command is transmitted in response to the press event recognized with delay even after the release command has been transmitted to the headset 2 in response to the timeout of the timer 58, the a plurality of press events generated in response to continuous depression of the volume adjustment button 52a can be process even when the release command is generated in response to the timeout of the timer 58.

Figure 9:
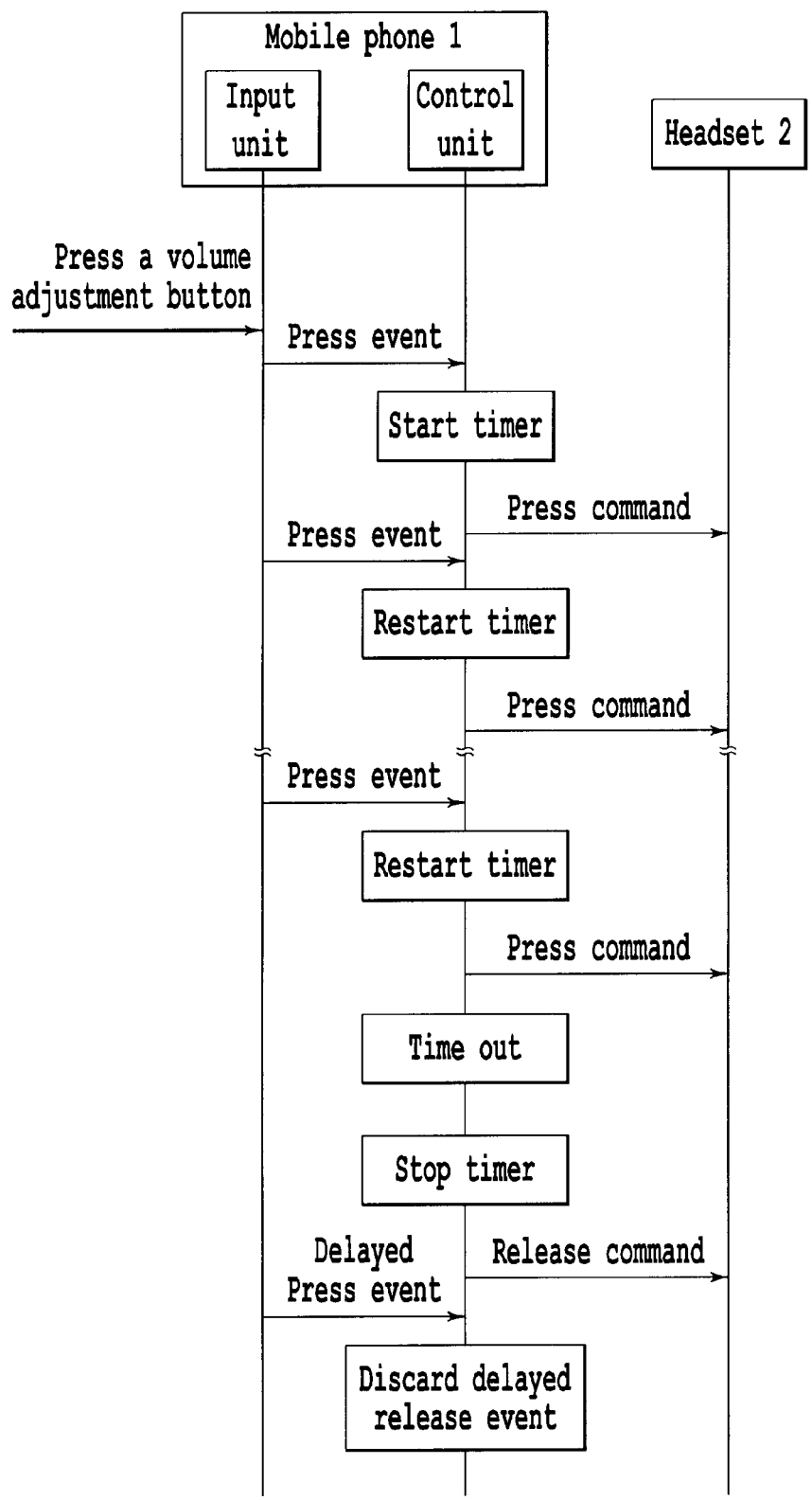
FIG. 9 is a sequential diagram showing another example of the volume adjustment to the headset.

FIG. 9 is a sequential diagram showing another example of the volume adjustment to the headset 2. The sequence as shown in FIG. 9 is different from the sequence as shown in FIG. 8 such that the event recognized by the control unit 51 after the timeout of the timer 58 is the release event. If, after the timeout of the timer 58, the control unit 51 recognizes a release event which should have been recognized before the timeout of the timer 58, the release event recognized with delay is discarded.

As described above, even when the delayed release event is recognized after the release command is transmitted to the headset 2 due to the timeout of the timer 58, the release command is not transmitted again. Thus, the mobile phone 1 can not only prevent the volume of the headset 2 from turning up and down unintentionally, but also avoid transmitting a redundant release command is transmitted to the headset 2

The present invention is not limited to the above-described embodiments, the constituent elements may be modified and embodied without deviating from the scope of the invention.

What is claimed is:

1. An information processing apparatus comprising:
a short-distance wireless communication unit which communicates with external equipment;
an input unit which includes a button, which generates a press event in response to a depression of the button, and generates a release event in response to a release of the button after the depression;
a timer which measures an elapsed time;
a control unit which starts the timer and transmits a press command to the external equipment via the short-distance wireless communication unit in response to a reception of a notification of the press event from the input unit, and which transmits a release command to the external equipment via the short-distance wireless communication unit in response to reception of a notification of the release event from the input unit, wherein the input unit is configured to periodically output a notification of the press event to the control unit at predetermined intervals during continued depression of the button where the button is continuously pressed without being released, wherein the control unit is configured to cause the timer to restart measurement of an elapsed time each time the control unit receives the notification of the press event which is periodically output by the input unit, and configured to cause timer to stop measurement of the elapsed time and transmit the release command to the external equipment when the control unit receives a notification of the release event from the input unit during the measurement of the elapsed time restarted by the timer, and wherein the control unit is further configured to transmit the release command to the external equipment via the short-distance wireless communication unit when the control unit does not detect reception of the notification of the release event from the input unit but detects that, after the press command is transmitted to the external equipment, the elapsed time measured by the timer reaches a specific time without detecting the reception of the notification of the release event.

2. The information processing apparatus according to claim 1, further comprising:
a buffer memory which stores at least one of the press event and the release event; and
wherein, the control unit discards the press event in the buffer memory when the release event is received from the input unit, after the control unit transmits the release command to the external equipment in response to the detection that the elapsed time reaches a specific time and no event is received from the input unit.

3. The information processing apparatus according to claim 2, wherein the control unit further discards the release event received from the input unit after the control unit transmits the release command to the external equipment in response to the detection that the elapsed time reaches a specific time and no event is received from the input unit.

4. An information processing apparatus comprising:
a short-distance wireless communication unit which communicates with external equipment;
an input means, which includes a button and which generates a press event in response to a depression of the button and which generates a release event in response to a release of the button from the depression;
a timer which measures an elapsed time; and
a control means for starting the timer, transmitting a press command to the external equipment via the short-distance wireless communication unit in response to receiving a notification of the press event from the input means, and transmitting a release command to the external equipment via the short-distance wireless communication unit in response to reception of a notification of the release event from the input means, wherein the input means is configured to periodically output a notification of the press event to the control means at predetermined intervals during continued depression of the button where the button is continuously pressed without being released, wherein the control means is configured to cause the timer to restart measurement of an elapsed time each time the control unit receives the notification of the press event which is periodically output by the input means, and configured to cause timer to stop measurement of the elapsed time and transmit the release command to the external equipment when the control means receives a notification of the release event from the input means during the measurement of the elapsed time restarted by the timer, and, wherein the control means is further configured to transmit the release command to the external equipment via the short-distance wireless communication unit when the control means does not detect reception of the notification of the release event from the input unit means but detects that, after the press command is transmitted to the external equipment, the elapsed time measured by the timer reaches a specific time without detecting the reception of the notification of the release event.

5. The information processing apparatus according to claim 4, further comprising:
a buffer memory which stores at least one of the press event and the release event;
wherein, the control means discards the press event in the buffer memory when the release event is received from the input means, after the control means transmits the release command to the external equipment in response to the detection that the elapsed time reaches a specific time and no event is received from the input means.

6. The information processing apparatus according to claim 5, wherein the control means further discards the release event received from the input means after the control means transmits the release command to the external equipment in response to the detection that the elapsed time reaches a specific time and no event is received from the input unit.

* * * * *